(12) United States Patent
Cheung

(10) Patent No.: US 10,248,991 B1
(45) Date of Patent: Apr. 2, 2019

(54) LINKING IMAGE ITEMS TO AN ELECTRONIC CATALOG

(75) Inventor: Jasper Cheung, Tokyo (JP)

(73) Assignee: Amazon Technologies, Inc., Seattle, WA (US)

( * ) Notice: Subject to any disclaimer, the term of this patent is extended or adjusted under 35 U.S.C. 154(b) by 750 days.

(21) Appl. No.: 12/947,700

(22) Filed: Nov. 16, 2010

(51) Int. Cl.
*G06Q 30/00* (2012.01)
*G06Q 30/06* (2012.01)

(52) U.S. Cl.
CPC .................... *G06Q 30/0643* (2013.01)

(58) Field of Classification Search
CPC ............. G06Q 30/06–30/0645; G06Q 30/08
USPC .................................................. 705/26–27.2
See application file for complete search history.

(56) References Cited

U.S. PATENT DOCUMENTS

| | | | |
|---|---|---|---|
| 6,748,360 B2 * | 6/2004 | Pitman et al. | 704/270 |
| 7,574,381 B1 * | 8/2009 | Lin-Hendel | 705/26.9 |
| 7,627,502 B2 * | 12/2009 | Cheng et al. | 705/27.2 |
| 8,296,291 B1 * | 10/2012 | Desjardins | 707/723 |
| 8,316,450 B2 * | 11/2012 | Robinson | G06F 21/10 726/26 |
| 8,429,005 B2 * | 4/2013 | Mannik et al. | 705/14.1 |
| 2008/0082426 A1 * | 4/2008 | Gokturk et al. | 705/27 |
| 2012/0323738 A1 * | 12/2012 | Gokturk et al. | 705/26.63 |
| 2013/0145292 A1 * | 6/2013 | Cohen | G06Q 10/00 715/760 |
| 2014/0100997 A1 * | 4/2014 | Mayerle | G06Q 30/0643 705/27.2 |

OTHER PUBLICATIONS

Amazon Remembers, retrieved on Nov. 16, 2010, at <<http://www.amazon.com/gp/feature.html?ie=UTF8&docId=1000291661>>, 2 pages.

* cited by examiner

*Primary Examiner* — Adam L Levine
(74) *Attorney, Agent, or Firm* — Lee & Hayes, P.C.

(57) ABSTRACT

Methods and systems for linking items found in images to an electronic catalog are usable to create and display hyperlinks in images stored on the Web. Additionally, these links are usable to direct customers to a merchant's on-line store where they can potentially purchase the items found in the images. Further, the linking of items may be usable to provide incentives to users who identify items within images or who provide linked images. Tokens or other monetary rewards may be presented to these users based on purchases made after the purchaser follows such links.

24 Claims, 7 Drawing Sheets

LINKING IMAGE ITEMS TO AN ELECTRONIC CATALOG

BACKGROUND

In both traditional brick-and-mortar stores and e-commerce sites, customers often purchase or otherwise consume items that are illustrated in images. In other words, consumers live in a world of images and may naturally react to what they see. For example, subsequent emotions about likes, dislikes, and ownership of image items may influence consumers' purchasing behavior.

However, while the customer may purchase a desired item illustrated in an image, in many instances the customer may not know from where the items may be purchased. For example, the customer may encounter an image containing a desired item while reading a blog and it may not be clear where this item may be purchased. As such, companies continue to explore techniques to enable customers and other users to more easily identify content providers (e.g., merchants) that sell or otherwise offer particular items found in images. Unfortunately, current systems are not equipped to help direct users to merchants that sell items illustrated in images found outside the merchant's store. As such, there is often a broken link between the desire to purchase and the action to purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
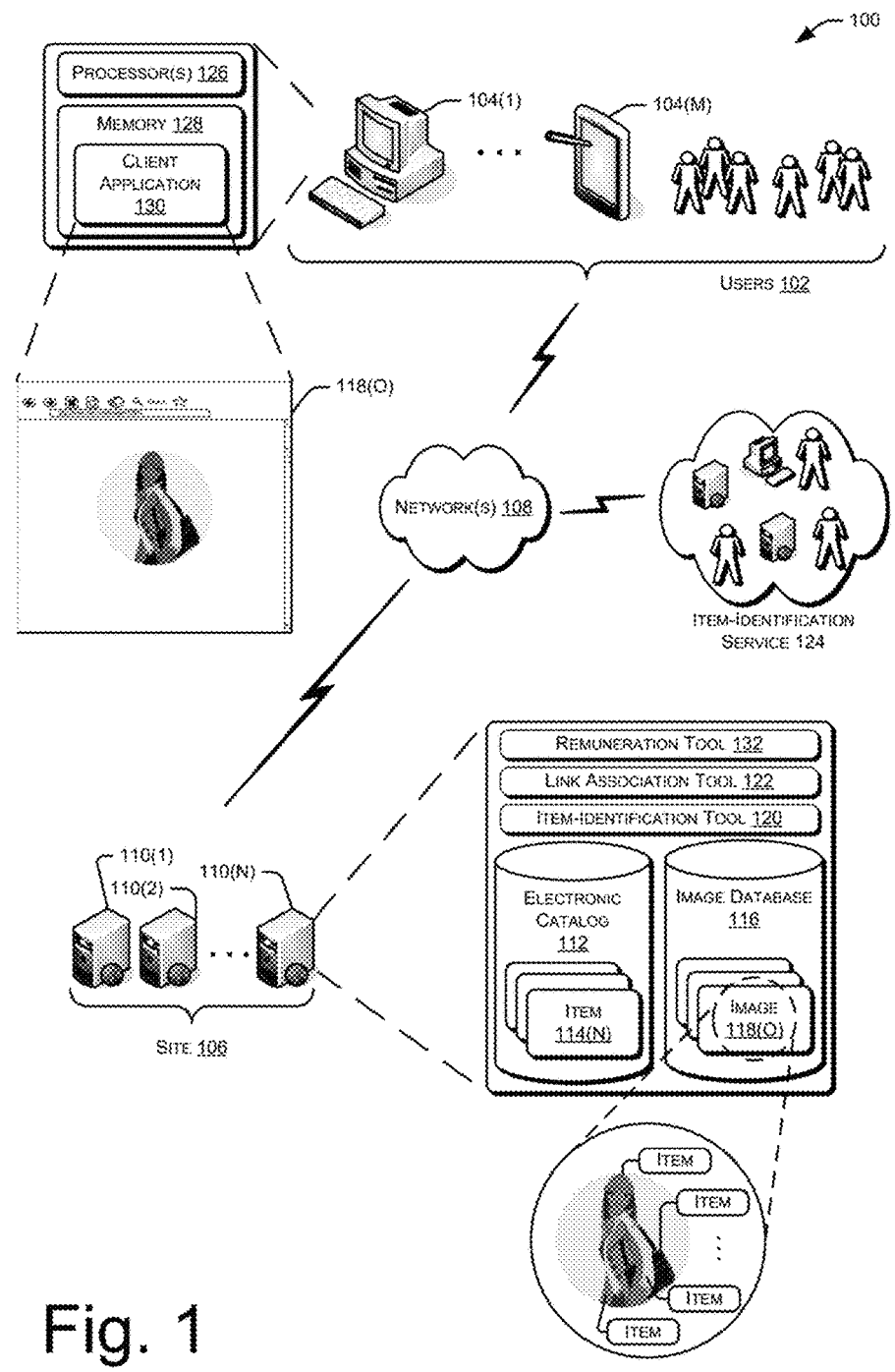
FIG. 1 illustrates an example architecture for linking items within images to respective item detail pages within an electronic catalog of items. Here, multiple users connect via a network to a site that hosts the electronic catalog.

Embodiments of the present disclosure are directed to, among other things, enabling the linking of image items to an electronic catalog. As an overview, an item may be a product, a service, a sellable unit, a user profile, customer-created content (e.g., artwork), or anything else that an image may somehow illustrate. An image, meanwhile, may comprise a digital photograph, an animation, a portion of a video, or any other type of image. An on-line merchant may crawl a network (e.g., the Web, a private intranet, etc.) for images that illustrate items that the merchant offers for sale. The merchant may then identify individual items within the image and associate therewith a link to the catalog. Additionally, a user may provide (e.g., upload) or may otherwise find or create an image that contains multiple items. The user may then identify the items and manually associate the links. Alternatively, or in addition, a user may discover on a network an image with which links to an item detail page of the electronic catalog have been automatically associated. That is, an on-line merchant or other content provider may have employed any number or type of object recognition technique to automatically identify and/or associate links to items of the image. In some instances, the described techniques may initiate rendering of the item detail page or acquisition of one or more of the items in response to selection of the link. By way of example only, selection of a link may include hovering over a link, clicking on a link, directing a cursor in a direction of a link, touching on the image or parts of the image, or the like.

In some instances, a user may upload an image to a site that is unassociated with the electronic catalog. For example, a user may upload an image to a personal blog or a social group that illustrates items offered for sale in an electronic catalog of a merchant unassociated with the user. In other instances, the provider of the electronic catalog, a search engine associated therewith, or an independent search engine may crawl a public network such as the Internet to discover images illustrating items. For example, an on-line merchant that hosts an electronic catalog may crawl and/or scrape the Internet for images containing items offered for sale in the merchant's electronic catalog. The images found by the merchant or uploaded by the user may be stored anywhere accessible by publicly networked computing devices.

In each case, the user, the merchant, and/or a manual item-identification service may identify the items illustrated in the images that correspond to items in the electronic catalog of the merchant. For example, a user may upload an image to the merchant's server, or to another Web accessible server, after identifying one or more items in the image that correspond to the electronic catalog. In some examples, the merchant may search the Internet for images, identify items within the images of the search results, and further store the images (with the item identification information) on a local server or on the server where the image was found. In other examples, a manual item-identification service such as Mechanical Turk or the like may identify items within images that correspond to the electronic catalog. In this case, the manual item-identification service may upload the images (with the identity information) to the merchant's server or to the original content provider.

Additionally, the user, the merchant, and/or the manual item-identification service may also associate the identified items with links to the item detail page within the electronic catalog. In this way, the images may help direct users to the item detail page for information about and/or the ability to purchase the identified items. As such, by associating the links to the items, the image may be altered such that it provides users with added functionality in the form of a direct way to research information about and/or purchase the item.

Furthermore, in some instances the linked image may display the link or a snapshot (e.g., a thumbnail image) of the item detail page when a cursor, or other UI element, hovers over or near the item. In this way, the image is able to display information about the item prior to the user selecting to be directed to the item detail page. In one instance, the displayed information may include item details, price options, or a quantity available. Additionally, the displayed information may include an option for adding the item to a shopping cart, finding similar items, or purchasing the item in response to a single user input (e.g., one-click purchasing). The item may also be purchased as a gift to be sent to others.

The discussion begins with a section entitled "Illustrative Architecture," which describes a non-limiting environment in which image items may be linked with associated item detail pages within an electronic catalog. Next, a section entitled "Illustrative User Interfaces" follows and describes examples of user interfaces (UIs) that may be served to and rendered at the devices of the users of FIG. 1. A section entitled "Illustrative Tools" then describes example tools for implementing the described techniques. Finally, the discussion concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts an illustrative architecture 100 in which techniques for linking image items with an electronic catalog may be implemented. In architecture 100, one or more users 102 utilize computing devices 104(1), . . . , 104(M) to access a site 106 of a service provider via a network 108. Network 108 may include any one or a combination of multiple different types of networks, such as cable networks, the Internet, wireless networks, and other private and/or public networks. While the illustrated example represents users 102 accessing site 106 over network 108, the described techniques may equally apply in instances where users 102 interact with a service provider over the phone, via a kiosk, or in any other manner. It is also noted that the described techniques may apply in other client/server arrangements (e.g., set top boxes, etc.), as well as in non-client/server arrangements (e.g., locally-stored software applications, etc.).

As described briefly above, site 106 may allow users 102 to upload images to site 106 or other sites, or otherwise search for images and request to obtain multiple items illustrated by the image. Additionally, site 106 may crawl networks 108 and/or other networks for images that illustrate items for sale at site 106. Site 106 may also allow users 102 or another entity to identify items within these images such that other users may request to obtain these identified items. In some embodiments, users 102 request to obtain information about the identified items in addition or in the alternative to requesting the actual identified items.

One or more servers 110(1), 110(2), . . . , 110(N), perhaps arranged in a cluster or as a server farm, host site 106. Other server architectures may also be used to host the site. Site 106 is capable of handling requests from many users and serving, in response, various user interfaces that can be rendered at user computing devices 104(1)-(M). Site 106 can be any type of site that supports user interaction, including online retailers, informational sites, social networking sites, blog sites, search engine sites, news and entertainment sites, and so forth. As discussed above, the described techniques can similarly be implemented outside of site 106.

In the illustrative environment, site 106 hosts an electronic catalog 112 that includes one or more items 114(1), . . . , 114(N). An item includes anything that site 106 offers for purchase, rental, subscription, viewing, informative purposes, or some other form of consumption. In some embodiments, the item may be offered for consumption by site 106, while in other embodiments, site 106 may host items that others are offering using the site. An item can include a product, a service, a digital download, a news clip, customer-created content (e.g., a customer review), information, or some other type of sellable or non-sellable unit.

Electronic catalog 112 is accessible, directly or indirectly, by one or more of servers 110(1)-(N). Each item 114, meanwhile, represents an associated physical or digital item and, as such, electronic catalog 112 may store information about each associated item. For items such as books or music CDs, for example, electronic catalog 112 may contain a description, images of the product, author/artist names, publication data, pricing, shipping information, and so forth. For other types of items, electronic catalog 112 may contain different information appropriate for those items.

In one aspect, images may reside on servers and/or other computing devices throughout networks 108. For example, computing device 104(1) may function as a Web server that provides content to users over networks 108. As such, an image that illustrates one or more items 114 of the electronic catalog 112 may be stored in and/or served by computing device 104(1). In one aspect, site 106 may crawl networks 108 and discover an image that illustrates such items. The site 106 may further identify the items 114 and associate links to the electronic catalog 112 for each item 114. Additionally, the site 106 may store the linked image back into the computing device 104(1) from where it was discovered or it may store a local copy in one or more of servers 110.

As illustrated, site 106 also stores or otherwise has access to an image database 116. Image database 116 stores or otherwise has access to one or more images 118(1), . . . , 118(O). Images 118(1)-(O) may comprise any sort of file that visually represents content, such as a digital photograph, a portion of a video, an animation, or any other file or portion of a file that user 102 can visually consume. Each of images 118(1)-(O) may illustrate one or more items that are available for consumption from electronic catalog 112 and/or from another electronic catalog. In addition to illustrating one or more items, each of these items illustrated by an image may have been previously identified as residing within the image.

To allow for identification of the illustrated items, servers 110(1)-(N) also store or have access to an item-identification tool 120. Item-identification tool 120 enables users 102, an operator of site 106, or some other entity such as an item-identification service 124 to identify items illustrated within images 118(1)-(O) and/or other items that are related to the illustrated items. In addition, to allow for link association of the identified items, servers 110(1)-(N) may also store or have access to a link association tool 122. For instance, the link association tool 122 may allow users to associate a particular item with a corresponding item in the electronic catalog 112 by assigning a hyperlink to the item or a portion of the image that represents the item. The hyperlink may direct a user to the item detail page within electronic catalog 112.

In some instances, tools 120 and/or 122 allow a user 102 to identify and/or associate an area that approximately frames an illustrated item with a respective item in electronic catalog 112. For instance, the user may associate this area with the same item in the electronic catalog, an item that is less expensive but similar to the illustrated item, or any other type of item. In other instances, however, the site 106 may utilize the tools 120 and/or 122 automatically as part of a searching and/or scraping exercise. For example, item-identification tool 120 may employ any type of object recognition technique. In this case, the site 106 may store the searched and/or scraped images 118(1)-(O) after the items have been identified and the links have been associated. As noted above, in some instance, the site 106 may store the images 118(1)-(O) locally, back at the source (i.e., the location they from where they were searched and/or scraped), or within a memory of a search engine index. Additionally, the item-identification service 124 may utilize the item-identification tools 120 and/or 122 to identify items and/or associate links within the images 118(1)-(O) or it may utilize its own manual or automatic item-identification and/or link associating techniques. Furthermore, in some instances users 102 may perform item-identification and/or link association manually, without the aid of the tools 120 and/or 122, and without interacting with the site 106 at all.

Taken together, FIG. 1 allows users 102 and/or other actors to associate image items with links to items 114(1)-(N) in an electronic catalog 112 for the purpose of allowing users 102 to be directed to a merchant site 106 for purchasing or otherwise acquiring the identified items. To illustrate, envision that site 106 discovers on computing device 104(1), while crawling networks 108, an image 118(O) of a woman wearing a hat, a jacket, a scarf, and carrying a purse. While FIG. 1 illustrates device 104(1) as a personal computer, other client computing devices may include laptop computers, portable digital assistants (PDAs), mobile phones, set-top boxes, game consoles, and so forth. In each instance and as illustrated, each user computing device is equipped with one or more processors 126 and memory 128 to store applications and data, such as a client application 130 that enables access to site 106. Alternatively, however, the user 102 may merely maintain the image 118(O) in local memory 128.

Once the image 118(O) is accessible to site 106 via the Internet or other network connection, other users 102, site 106, or service 124 may identify the items illustrated by the image and associate links to the electronic catalog 112 for each respective item that exists therein. For instance, these actors may associate items within the uploaded image with corresponding items in electronic catalog 112. For instance, the illustrated hat may be associated with the same hat within the electronic catalog 112, the illustrated scarf may be associated with the same scarf within the electronic catalog 112, and so forth. The purse, meanwhile, may be associated with the same purse in electronic catalog 112 as well as a purse that is superior to the illustrated purse.

In any of these instances, once items within an image have been identified and mapped to items in electronic catalog 112 via the associated links, any user who views the image on the Internet may view and/or click on the links. For instance, one user may access the image 118(O) on another user's social network site or other Web page, such as a blog or the like. While viewing the image, this user may be able to see the URL, a snapshot of the item detail page, or other related options, by selecting the item and/or an area associated with the item. For instance, the user may hover a cursor or other UI element over the identified item or may select the item and/or area in any other way.

In one example, hovering a cursor includes instances where the cursor is placed over an area that borders any pixels of the item. In other words, the cursor may be placed over any pixel of the item or it may be placed over an area that falls within the border that covers all pixels of the item. As such, a square or other shaped border may be drawn around the entire item (or a portion of the item) and hovering may be effectuated by placing the cursor anywhere within the border. Additionally, the computer 104(1) of the user that is viewing the image may render the item detail page of the electronic catalog 112 associated with the identified item after the user 102 clicks on or otherwise makes an additional selection of the link.

In some instances, the site 106 may also be configured to provide remuneration, or other type of incentive, to a user 102 that creates or otherwise provides the item identification and/or link association. For instance, as noted above, a user 102 may identify items and/or associate links to an electronic catalog 112 in an image 118(O) of their own. Additionally, the user 102 may then upload the image 118(O) to the site 106, to their own or another's Website, or to some other location accessible by a search engine. Subsequently, another user may discover this image 118(O) while surfing, or otherwise accessing, the Internet and may further select the link to be taken to the item detail page of site 106 corresponding to item 114 illustrated in image 118(O). Additionally, if the user, upon navigating to the item detail page, subsequently purchases the item 104, the site 106 may provide remuneration to the user 102 that provided and associatively linked the image 118(O). As such, the site 106 may incentivize users 102 to link image items to the electronic catalog 112 and/or upload linked images to the site 106, to their own Websites, or to other Websites.

To allow for remuneration of linked image providers, servers 110(1)-(N) may also store or have access to a remuneration tool 132. Remuneration tool 132 may enable users 102 or other entities, such as the item-identification service 124, to receive payment for providing linked images or for linking images that are otherwise already provided. In some instances, remuneration tool 132 may provide payment in the form of a portion of the sale price of the item 114. Additionally, in some instances the remuneration tool 132 may be configured to provide a token, badge, or other symbol of monetary credit that can be transmitted with the instruction to render the item detail page. This token may track that the image was clicked so that the provider or server of the image may be compensated. In some instances, the remuneration tool 132 may compensate the owner of the image, a search engine that provided the image to the eventual purchaser, or the person who made the item to detail page association.

Illustrative User Interfaces

Figure 2:
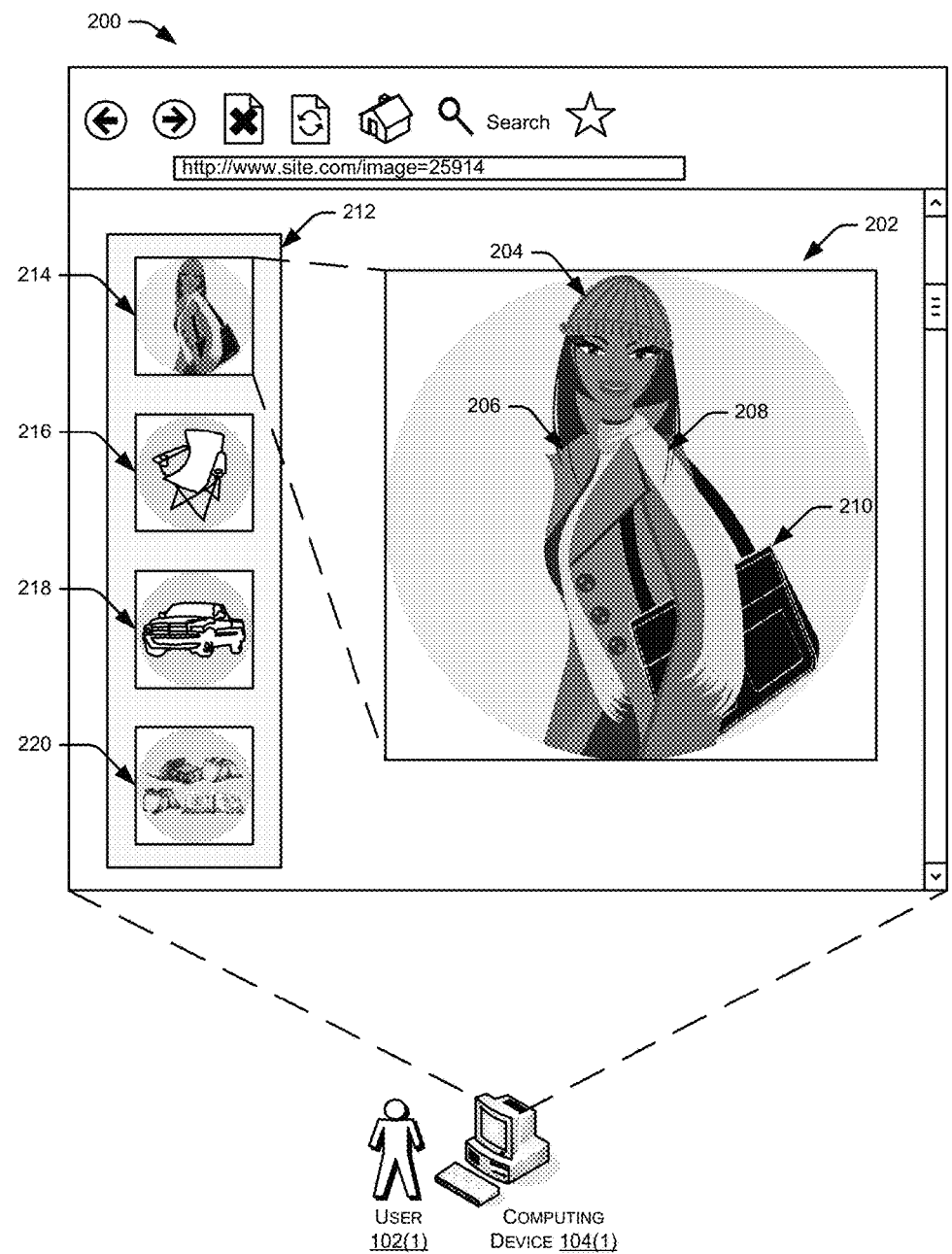
FIG. 2 illustrates an example user interface (UI) that the site or client computer of FIG. 1 may serve. This UI includes an image illustrating multiple items that may be found within the electronic catalog.

FIG. 2 represents an illustrative user interface 200 that site 106 may serve to computing device 104(1) of one of users 102. In other instances, however, the illustrative user interface 200 may be served to the computing device 104(1) from a search engine not associated with the site 106. Here, user interface 200 includes an image 202 that illustrates multiple items, each of which have previously been associated with one or more items within electronic catalog 112 and/or within one or more other electronic catalogs. As discussed above, image 202 may comprise a digital photograph, a portion of a video file, an animation, or any other type of content that can visually represent one or more items.

Here, image 202 comprises a digital photograph of a woman donning various clothing items and accessories. One of users 102, site 106, or another entity such as a search engine or other Web site may have provided this image. As illustrated, image 202 illustrates a hat 204, a jacket 206, a scarf 208 and a purse 210. Users 102, item-identification service 124, site 106 or another entity may have associated each of items 204-210 with an item in electronic catalog 112 and/or in one or more other electronic catalogs.

For instance, these actors may have associated each item with a corresponding item in electronic catalog 112. To illustrate, hat 204 may be associated with the same hat offered for purchase from electronic catalog 112. As such, image 202 and/or hat 204 may be tagged as being associated with this item in the electronic catalog. Additionally or alternatively, an area that approximately frames hat 204 may be associated with a link to a page associated with hat 204. For instance, this area may be associated with a link to a page that includes details of hat 204, reviews of hat 204 or any other page that somehow relates to the illustrated hat.

While hat 204 may be associated with the same hat within electronic catalog 112, illustrated hat 204 may additionally or alternatively be associated with another item or multiple items of the same kind in electronic catalog 112. For instance, one of users 102 may have previously associated hat 204 (and, hence, image 204) with an item that the user feels is an alternative to the illustrated hat. This user may have, for example, associated illustrated hat 204 with a hat that is similar but less expensive, or similar but purportedly superior to the illustrated hat. Illustrated hat 204 may also have been associated with any other item within electronic catalog 112.

Each of items 206-210 may similarly be associated with one or more items in electronic catalog 112 and/or one or more other electronic catalogs. For instance, jacket 206 may be associated with the same or a different jacket within electronic catalog 112, while scarf 208 and purse 210 may similarly be associated with one or more corresponding items. In general, however, each item may at least be associated with its corresponding item within the electronic catalog 112, if such an item exists.

As noted above, in some instances user interface 200 may be used to display the contents of a Web page, such as a blog or social networking site, which is unassociated with the electronic catalog 112. For example, user interface 200 may display the image in response to a user surfing the Web or uploading an image to a blog or other Web site. When the image is found while surfing the Web, the image may already contain links to corresponding item detail pages within electronic catalog 112. Alternatively or in addition, where the image is being uploaded by a user, the user may be responsible for identifying the items with corresponding item detail pages and/or associating the links.

Additionally, user interface 200 may display image 202 to a user in response to an image search, or other type of Web search. As such, user interface may be served by a search engine or other Web application that may perform searches. Here, user interface 200 displays image search results 212 within a UI element on the left side of user interface 200. However, this is merely one example of any number of ways to represent image search results 212, or any other type of search results. While image search results 212 contain images including woman 214, foldable lawn chair 216, pickup truck 218, and pile of books 220, image search results 212 may contain any number and/or type of images.

Additionally, as described above, each image may contain one or more items, each of which may correspond to an item detail page in electronic catalog 112. In this example, user interface 200 may display a larger version of image 202 based on a selection of the image of woman 214 from search results 212.

Figure 3:
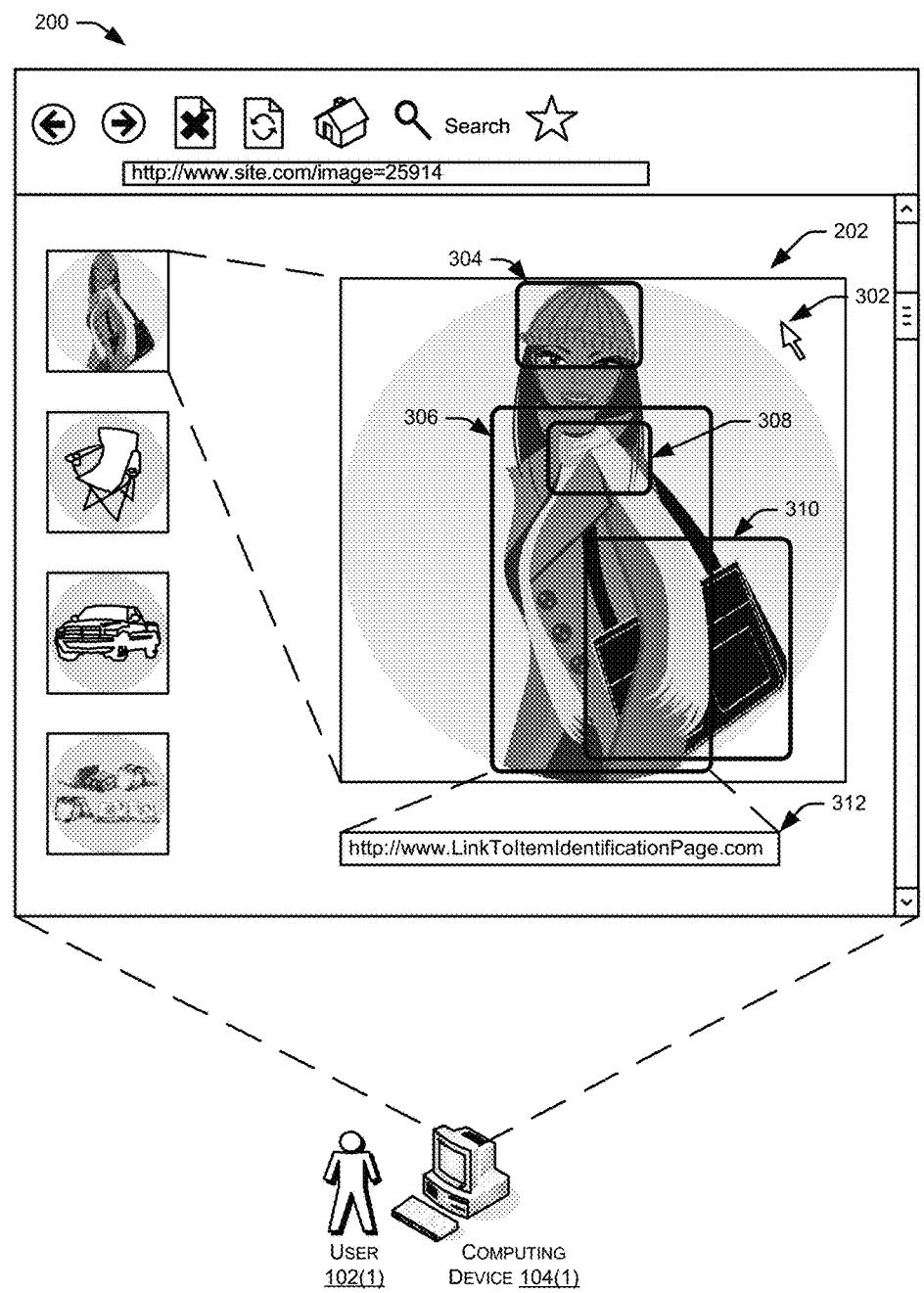
FIG. 3 illustrates an example UI of FIG. 2 after a user or other entity has identified items in the image that reside within the electronic catalog. In response, the UI highlights or otherwise identifies those items in the image that have been identified. In some instances, the UI may display an associated link that can direct a user to the item detail page.

FIG. 3 illustrates user interface 200 after the user has placed cursor 302 of an input device over image 202 that has items associated with electronic catalog 112. In response, user interface 200 illustrates a corresponding highlight 304, 306, 308, 310 over each of items 204-210. By doing so, user interface 200 communicates to the user which illustrated items have been associated with one or more items in the electronic catalog 112 and/or with one or more items in another electronic catalog. As discussed above, highlights 304-310 may also indicate that the corresponding area of image 202 has been associated with a link 312 to a page that is associated with the illustrated item and/or with a related item.

In some instances, user interface 200 may also display other content in response to the user placing cursor within one of highlights 304-310. For instance, responsive to the user placing cursor 302 into an area defined by highlight 306, site 106 may cause display of link 312. Additionally or alternatively, responsive to the user placing cursor 302 into an area defined by highlight 304, site 106 may cause display of details about the item that has been associated with this area (e.g., details such as price and availability of the corresponding purse in electronic catalog 112). Site 106 may additionally or alternatively display user reviews of the illustrated item and/or the item that has been associated with the illustrated item and/or any other content about the item or about the entity that associated the illustrated item with an item in an electronic catalog. Further, in one instance, site 106 may display a snapshot of the item detail page representing the page the user would be directed to if the associated item were selected, rather than, or in addition to, displaying link 312 or other details.

Figure 4:
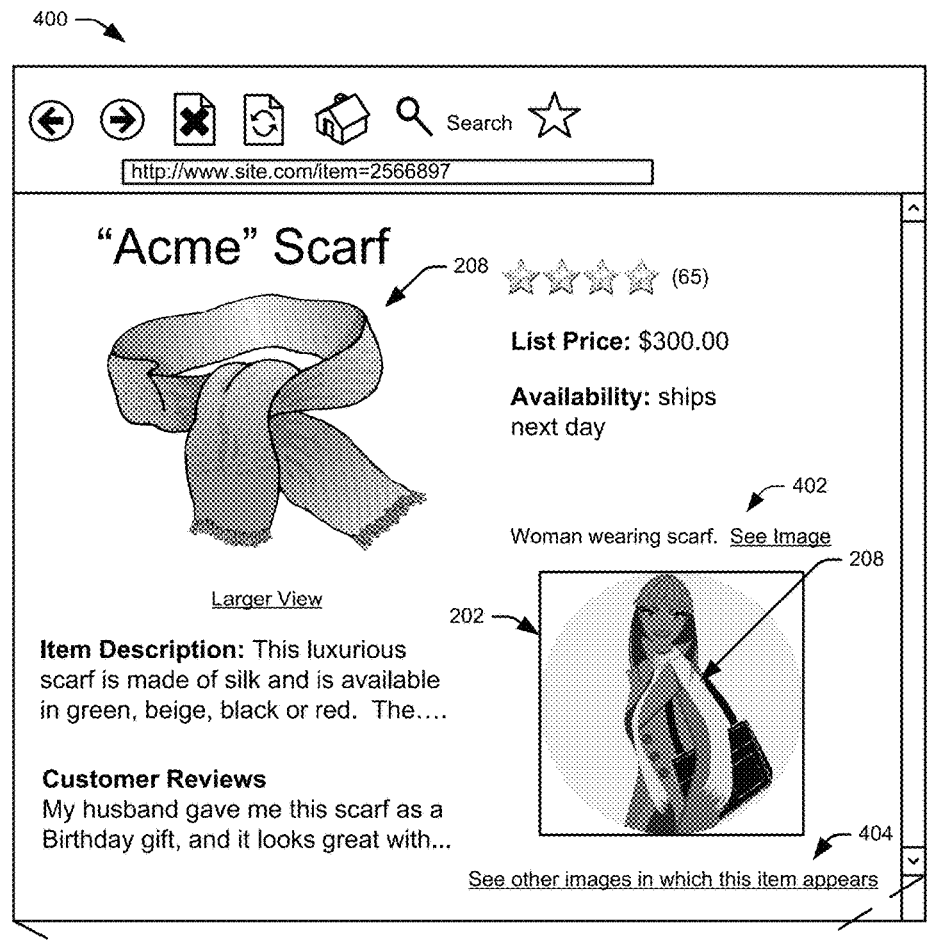
FIG. 4 illustrates an example item detail page associated with an item illustrated by the images of FIGS. 2 and 3. Here, the item detail page includes an indication that the item may also appear in the image of FIGS. 2 and 3.
Figure 4:
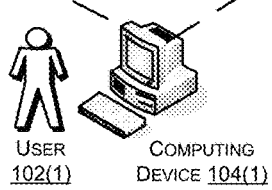

FIG. 4 illustrates an example user interface 400 that includes details about a particular item that has been associated with image 202. In one instance, user interface 400 may be one example of an item detail page. Specifically, user interface 400 includes details about scarf 208 illustrated within the image of FIGS. 2 and 3. In this example, one of users 102, item-identification service 124, site 106, or another entity has previously associated scarf 208 with image 202.

User interface 400 also includes an indication 402 that the illustrated item (here, scarf 208) appears in image 202 of FIGS. 2 and 3. This UI also includes image 202. The user viewing user interface 400 may select a link within indication 402 and/or may select image 202 for the purpose of navigating to user interface 200. Finally, user interface 400 includes a link 404 ("See other images in which this item appears") that, when selected, causes site 106 to serve one or more other images in which scarf 208 also appears. As can be appreciated, image 202 and link 404 allow the user viewing user interface 400 to view the illustrated item within a collection of items. Furthermore, if the user views a collection within an image that particularly suits the user, then the user may request to acquire additional items from the collection or from the image.

Illustrative Tools

Figure 5:
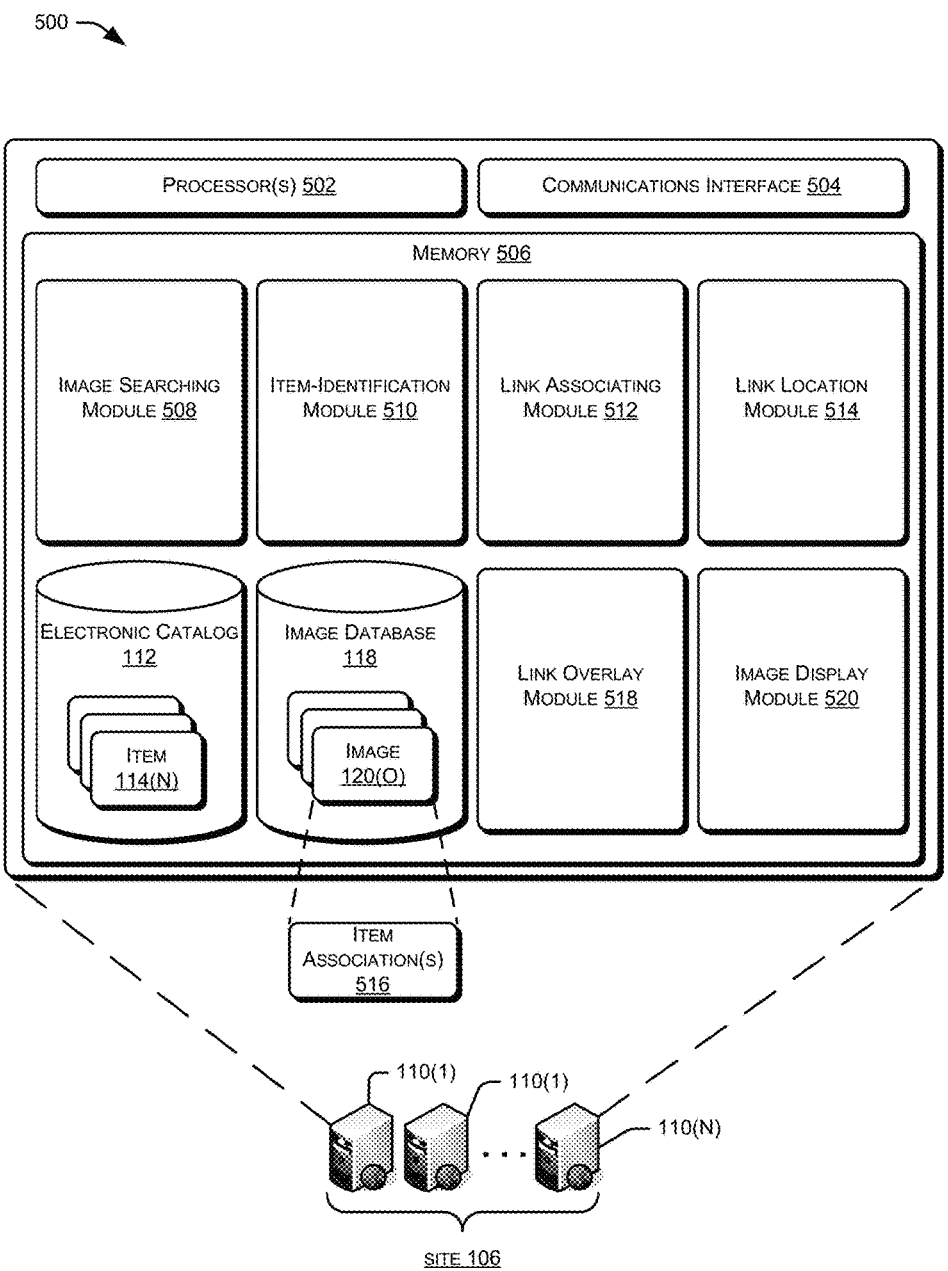
FIG. 5 is a block diagram of a computer environment showing an illustrative system in which the linking of image items to an electronic catalog may be implemented.

FIG. 5 illustrates servers 110(1)-(N) having processing capabilities and memory suitable to store and execute computer-executable instructions. In this example, server(s) 110(1)-(N) include one or more processor(s) 502, communications interface 504, and memory 506. Depending on the configuration of computing device 500, memory 506 is an example of computer storage media and may include volatile and nonvolatile memory. Thus, memory 506 may include, but is not limited to, RAM, ROM, EEPROM, flash memory, or other memory technology, or any other medium which can be used to store media items or applications and data which can be accessed by computing device 500.

Memory 506 may be used to store any number of functional components that are executable on processor(s) 502, as well as data and content items that are rendered by computing device 500. Thus, memory 506 may store an operating system and several modules containing logic.

A search module 508 located in memory 506 and executable on processor(s) 502 may facilitate searching for images on networked storage devices such as servers accessible via the Internet. In one instance, search module 508 may be configured to crawl and/or scrape images from the Internet. These images may then be stored in image database 116 of memory 506 for further processing and/or for displaying to users in response to image queries. Additionally or alternatively, search module 508 may be configured to perform specific image searches for users either by searching the Web or searching image database 116. As such, site 106 may be an implementation of a search engine or a Web application used for searching images on the Internet. Search module 508 may also be used to search for items 114(1)-(N) within electronic catalog 112 stored in memory 506.

Memory 506 may further store item-identification module 510 to identify items within images. In one aspect, item-identification module 510 may be configured to automatically identify image items that correspond to items 114(1)-(N) in electronic catalog 112. In another aspect, however, item-identification module 510 may be configured to aid in a user's identification of image items that correspond to electronic catalog 112. Additionally, item-identification module 510 may also be configured to provide images to a human evaluation group and receive images 118(1)-(O) that have had items manually identified already. In at least one example, item-identification module 510 may receive images 118(1)-(O) with some identified items, and may automatically identify additional items illustrated in images 118(1)-(O).

Memory 506 may also store link association module 512 and link location module 514. Link association module 512 may be configured to facilitate associating links to items identified by item-identification module 508, by users, or by other manual item identifiers. As discussed above, link associating module 512 may be responsible for providing a URL to the item detail page corresponding to items 114(1)-(N) identified in images 118(1)-(O). Link location module 514, however, may be configured to determine a portion of image 118(O) to associate the link. Additionally, in one instance, item association information 516, such as the associated link, a snapshot of the item detail page, and/or the link location may be stored with each respective image 118(O) of image database 116. However, in other instances, item association information 516 may be stored in link overlay module 518.

As discussed above, in some aspects, site 106 may store the images 118(1)-(O) in image database 116. However, in other aspects, images 118(1)-(O) may be stored remotely with or without the associated links or item association information 516. As such, computing device 500, in one configuration, may also include link overlay module 518 stored in memory 506 and executed on processor(s) 502, responsible for storing overlay information corresponding to the item association information 516. In this way, if site 106 attempts to display the associated links along with images 118(1)-(O) that are stored remotely, link overlay module 518 may lay the links over images 118(1)-(O) without the links and/or associated information being a part of the images 118(1)-(O) themselves.

Additionally, memory 506 may further store an image display module 520 configured to facilitate displaying images with or without the associated links. As discussed above, in one aspect, image display module 520 may display images 118(1)-(O) that are stored locally in image database 116 of memory 506. However, in other aspects, image display module 520 may display images that are stored remotely on other networked storage device, such as servers or other computing devices accessible via the Internet.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

Illustrative Processes

Figure 6:
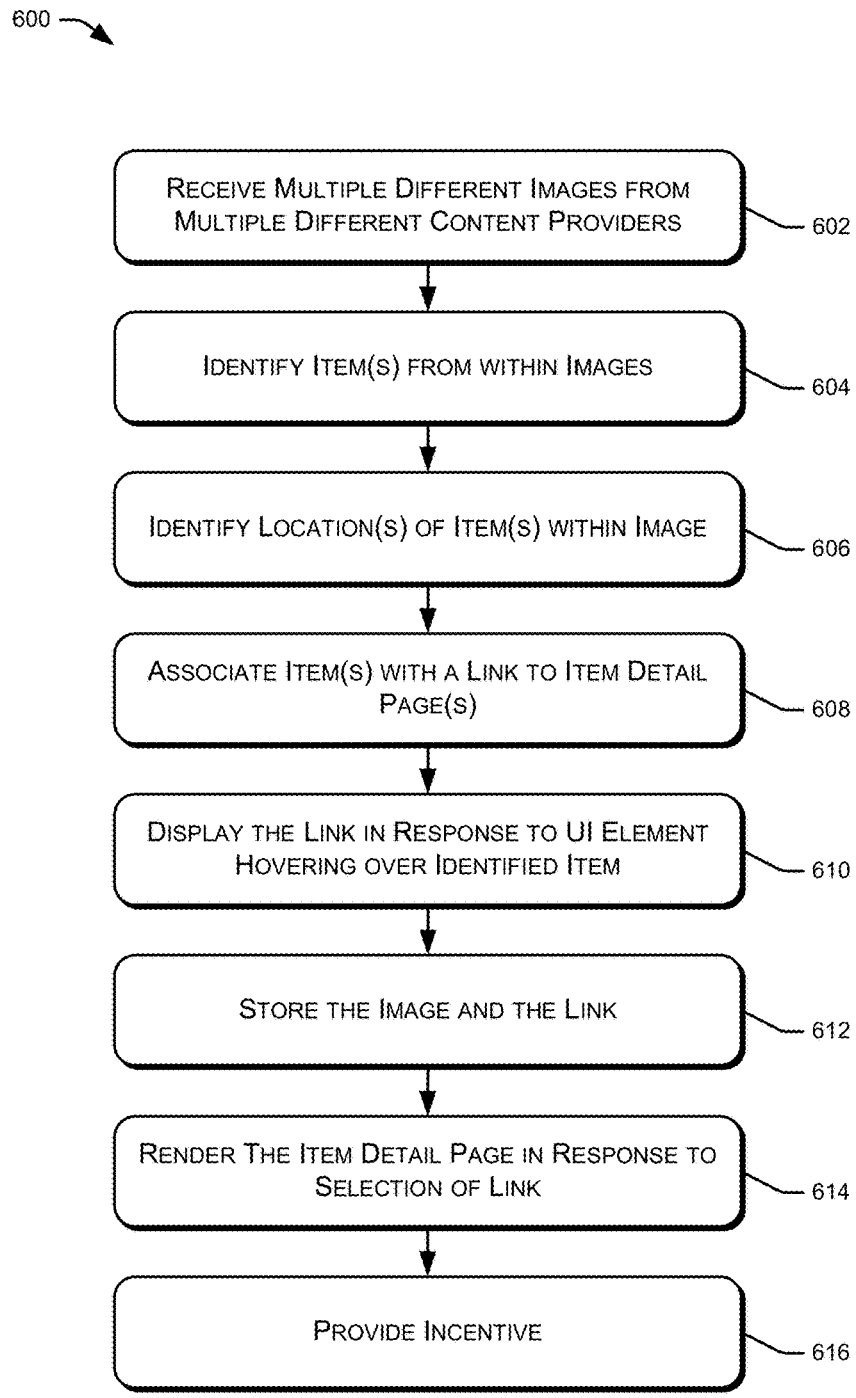
FIGS. 6 and 7 are flow diagrams of an embodiment of a process for enabling the linking of image items to an electronic catalog.
Figure 7:
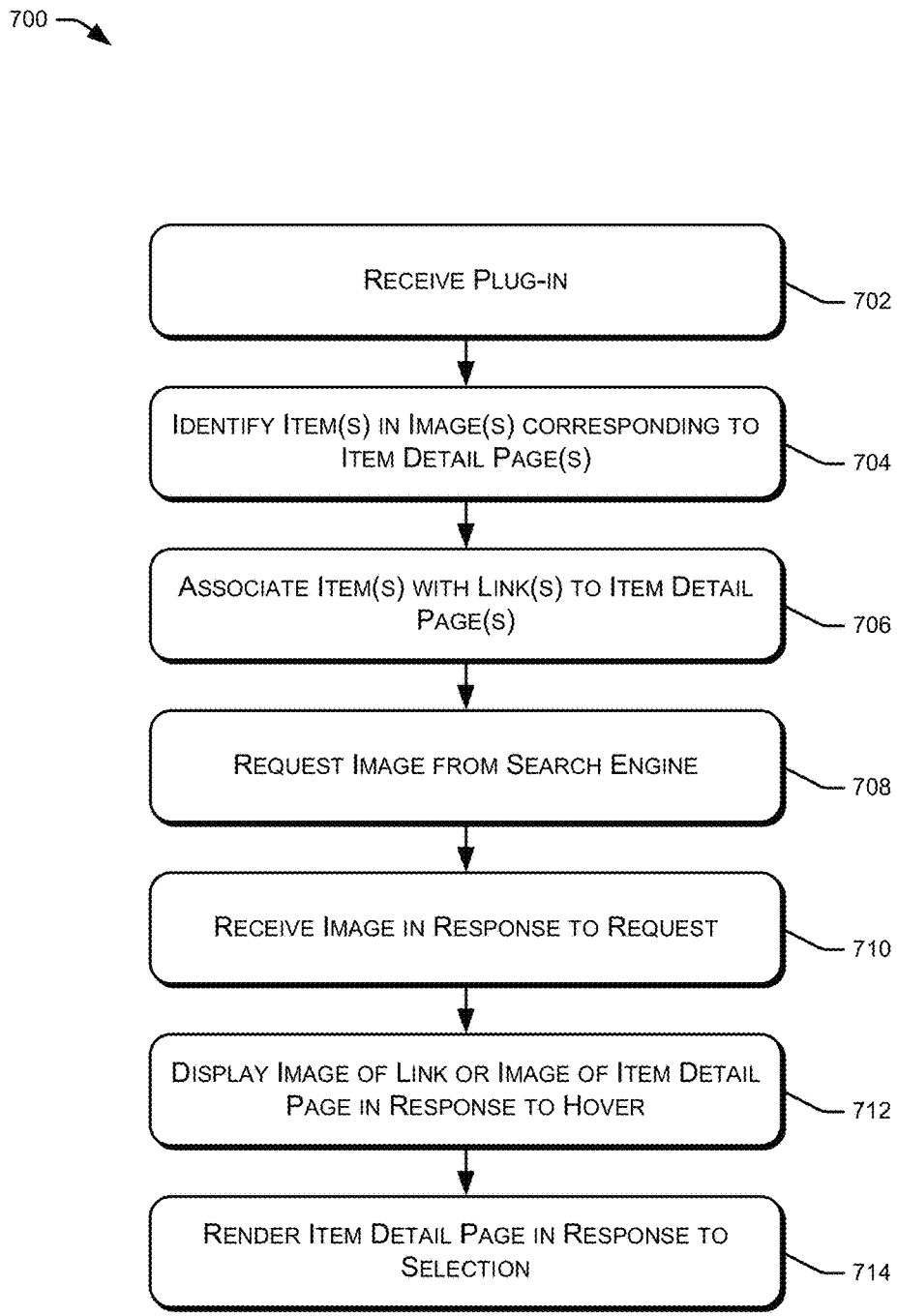

FIGS. 6-7 are flow diagrams showing respective processes 600 and 700 for linking image items to an electronic catalog. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 6 illustrates an example flow diagram of process 600 for linking image items to an electronic catalog to aid in directing potential customers to a merchant's on-line store, as discussed above.

Process 600 includes receiving multiple different images from multiple different content providers at 602. In one aspect, each image may come from a different content provider. Alternatively or in addition each content provider may provide one or more images. As discussed above, content providers may include manual item-identification services (e.g., Mechanical Turk®), individual users, Web servers, and/or other Internet accessible computing devices. At 604, process 600 may identify one or more items within the images that correspond to item detail pages of an electronic catalog. In some instances, however, as noted above, the identification may be performed by a user or other entity other than process 600. At 606, process 600 may identify locations of the items within the images. This way, process 600 may be able to store the location in the image for each identified item. At 608, process 600 may associate item(s) with a link to its associated item detail page.

At 610, process 600 may display the link associated with the identified item in response to a user hovering a cursor, or other UI feature, over the identified item. In some instances, a UI may display the link, a highlight approximating the location of the item, a snapshot of the item detail page, and/or other related information. Process 600 may store the image and the associated links in a computer-readable memory at 612. At 614, process 600 may render the item detail page in response to a user selecting the link with a cursor. Further, in one instance, process 600 may provide an incentive to a content provider associated with the image that led to the purchase or to the provider of the item identification or link association. In some instances, a portion of the purchase price, or some other incentive such as a token or badge, may be provided to the provider of the image, the provider of the item identification, the provider of the link association, and/or an entity that hosts and/or searches for images that contain the link. Any type of incentive may be used, such as cash in the form of revenue sharing or other types of remuneration such as store credits, discounts, badges, or the like.

FIG. 7 illustrates an example flow diagram of process 700 for an alternative implementation for linking image items to an electronic catalog to, for example, aid in directing potential customers to a merchant's on-line store, as discussed above.

Process 700 includes receiving a plug-in for linking and/or displaying links to items illustrated in images that correspond to items in an electronic catalog at 702. At 704, process 700 may, based on instructions from the plug-in, identify items in images corresponding to the item detail pages as described above. At 706, process 700, also based on instructions from the plug-in, may associate the identified items with links to the item detail pages. In one instance, both item identification and link association may be performed by the plug-in. At 708, process 700 may request an image(s) from a search engine.

At 710, process 700 may, in response to the search engine request, receive an image corresponding to the specific query made. Process 700 may display an image of the associated link or an image of the item detail page (i.e., a snapshot) over the image at block 712. In some instances, other information may be displayed over the image as well, including but not limited to item information, purchase information, options for check-out, and the like. At 714, process 700 may render the associated item detail page in response to selection of the link. In some aspects, other functions may be performed based on the particular selection. For example, if process 700, or a user operating process 700, selects a "show me related items" option, process 700 may render an item detail page of a related item in the electronic catalog rather than the item detail page of the item illustrated in the image.

CONCLUSION

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A computer-implemented method comprising:
   discovering, using a computing device having one or more hardware processors via a network storage device operated by a first entity, a first image that includes an item, the first image being publicly accessible via the network storage device;
   retrieving the first image from the network storage device using the computing device;
   identifying, using the computing device, the item within the first image;
   associating, using the computing device, the item with item association information, the item association information including a link, a second image, and a link location associated with a portion of the first image including the item, wherein the link provides direct access to an item detail page, the item detail page containing item information that is not stored on the network storage device, the item detail page being generated with electronic catalog data stored on an electronic marketplace device operated by a second entity, the second entity being different than the first entity, the second image being an image of at least a portion of the item detail page that would be displayed in response to selecting the link;
   associating the first image with the item association information to generate a linked image;
   storing the linked image on the network storage device from which the first image was retrieved, such that subsequent retrieval of the first image is rendered as the linked image;
   displaying the linked image via the network storage device;
   displaying, in response to a user interface element hovering over the item of the displayed linked image, the second image over a portion of the displayed linked image;
   receiving an indication that the link to the item detail page has been selected; and
   at least partially in response to receiving the indication, causing display of the item detail page corresponding to the item.

2. The computer-implemented method of claim 1, further comprising discovering the first image based in part on crawling a public network.

3. The computer-implemented method of claim 1, further comprising receiving item information via an object recognition technique.

4. The computer-implemented method of claim 1, further comprising receiving item information from an item-identification service.

5. The computer-implemented method of claim 1, further comprising:
   identifying an additional item within the first image; and
   associating the additional item with additional item association information, the additional item association information including an additional link, an additional image, and an additional link location associated with a second portion of the first image including the additional item, wherein the additional link provides direct access to an additional item detail page that contains additional item information that is not stored on the network storage device, the additional item detail page being generated with additional electronic marketplace data stored on the electronic marketplace device operated by the second entity, the additional image being an image of at least a portion of the additional item detail page that would be displayed in response to selecting the additional link.

6. The computer-implemented method of claim 1, wherein the first image is a portion of video content.

7. The computer-implemented method of claim 1, further comprising discovering the first image using a public search engine.

8. The computer-implemented method of claim 1, further comprising, in addition to storing the linked image on the network storage device from which the first image was retrieved, storing the linked image in a local memory of the electronic marketplace device.

9. The computer-implemented method of claim 1, wherein the first entity comprises a social networking site and the first image comprises a personal image, the social networking site enabling a user to upload the personal image to a user profile hosted by the social networking site.

10. One or more non-transitory computer-readable storage media storing computer-executable instructions that, when executed by a processor, perform acts comprising:
discovering, via a network storage device operated by a first entity, a first image that includes an item, the first image being publicly accessible via the network storage device;
in response to retrieving the first image from the network storage device, identifying an item included within the first image;
creating a link to be associated with the item, the link providing direct access to a page that describes the item, wherein the page is generated using electronic catalog data stored on an electronic marketplace device operated by a second entity, the second entity being different than the first entity;
associating the first image with item association information to generate a linked image, the item association information including at least the link, a second image, and a link location associated with a portion of the first image that includes the item, the second image being an image of at least a portion of the page that describes the item;
storing the linked image on the network storage device from which the first image was retrieved, such that subsequent retrieval of the first image is rendered as the linked image;
displaying the linked image via the network storage device;
displaying, over a portion of the displayed linked image, the second image in response to a user interface element hovering over the item of the displayed linked image;
receiving an indication that the link to the page that describes the item has been selected;
at least partially in response to receiving the indication, causing display of the page that describes the item; and
causing a reward to be provided to the first entity that operates the network storage device in response to a transaction involving the item associated with the link that has been selected.

11. The one or more non-transitory computer-readable storage media of claim 10, wherein the first entity comprises a social networking site and the first image comprises a personal image, the social networking site enabling a user to upload the personal image to a user profile hosted by the social networking site.

12. The one or more non-transitory computer-readable storage media of claim 10, wherein the acts further comprise storing the linked image in a memory associated with a search engine.

13. The one or more non-transitory computer-readable storage media of claim 10, wherein the acts further comprise storing the linked image in a local memory associated with the electronic marketplace device.

14. The one or more non-transitory computer-readable storage media of claim 10, wherein the identifying the item included within the first image comprises one or more of:
identifying the item using a recognition technique; or
receiving identification of the item from an item-recognition service.

15. The one or more non-transitory computer-readable storage media of claim 10, wherein the reward comprises one or more of a portion of revenue generated from the transaction, a credit to an electronic catalog, or a discount for an item offered for sale via the electronic catalog.

16. One or more devices comprising:
one or more processors; and
one or more memories storing instructions that, when executed by the one or more processors, configure the one or more devices to:
discover, via a network storage device operated by a first entity, a first image that includes an item, the first image being publicly accessible via the network storage device;
retrieve the first image from the network storage device;
identify the item within the first image;
associate the item with item association information, the item association information including a link, a second image, and a link location associated with a portion of the first image including the item, wherein the link provides direct access to a page that describes the item, the page is generated using electronic catalog data stored on an electronic marketplace device operated by a second entity, the second entity being different than the first entity, the second image being an image of at least a portion of a page that describes the item and would be displayed in response to selecting the link;
associate the first image with the item association information to generate a linked image;
cause the linked image to be stored on the network storage device from which the first image was retrieved, such that subsequent retrieval of the first image is rendered as the linked image;
display the linked image via the network storage device;
display the second image over a portion of the displayed linked image in response to a user interface element hovering over the item of the displayed linked image;
receive an indication that the link to the page that describes the item has been selected via the user interface element; and
at least partially in response to receiving the indication that the link has been selected, cause display of the page that describes the item.

17. The one or more devices of claim 16, wherein the instructions further cause the one or more devices to determine a portion of revenue to provide to the first entity that operates the network storage device, the portion of revenue generated from a transaction involving the item following a selection of the link via a user interface.

18. The one or more devices of claim 16, wherein the instructions further cause the one or more devices to discover the first image based in part on crawling a public network.

19. The one or more devices of claim 16, wherein identify the item within the first image comprises receive item information via an automatic object recognition technique.

20. The one or more devices of claim 16, wherein identify the item within the first image comprises receive item information from an item-identification service.

21. The one or more devices of claim 16, wherein the first image includes an additional item, and the instructions further cause the one or more devices to:
   identify the additional item using an object recognition technique; and
   associate the additional item with an additional item association information, the additional item association information including an additional link directing to an additional page that describes the additional item, an additional image of a portion of the additional page that describes the additional item, and an additional link location associated with a second portion of the first image including the additional item.

22. The one or more devices of claim 21, wherein the link location associated with the second portion of the first image including the additional item includes pixels of the first image within a boundary that frames the second portion of the first image.

23. The one or more devices of claim 16, wherein the instructions further cause the one or more devices to discover the first image using a public search engine.

24. The computer-implemented method of claim 1, further including determining a portion of revenue to be provided to the first entity that operates the network storage device, the portion of revenue determined from a purchase of the item via the item detail page following selection, via the user interface element, of the link that describes the item.

* * * * *